US012014678B1

(12) United States Patent
Dai

(10) Patent No.: US 12,014,678 B1
(45) Date of Patent: Jun. 18, 2024

(54) METHOD, APPARATUS, AND DEVICE FOR PERFORMING BRIGHTNESS ATTENUATION COMPENSATION OF A DISPLAY PANEL

(71) Applicant: Wuhan Tianma Microelectronics Co., Ltd., Wuhan (CN)

(72) Inventor: Wenbin Dai, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/129,919

(22) Filed: Apr. 3, 2023

(30) Foreign Application Priority Data

Jan. 17, 2023 (CN) ......................... 202310090265.4

(51) Int. Cl.
*G09G 3/3208* (2016.01)

(52) U.S. Cl.
CPC ... *G09G 3/3208* (2013.01); *G09G 2300/0842* (2013.01); *G09G 2320/0233* (2013.01)

(58) Field of Classification Search
CPC ......... G09G 3/3208; G09G 2300/0842; G09G 2320/0233
See application file for complete search history.

(56) References Cited

U.S. PATENT DOCUMENTS 7,301,618 B2 * 11/2007 Cok ..................... G09G 3/3208 345/82
2006/0087588 A1 4/2006 Cok
2008/0018570 A1 * 1/2008 Gerets .................. G09G 3/3208 345/84
2014/0168039 A1 * 6/2014 Kim ..................... G09G 3/3208 345/82
2020/0202772 A1 6/2020 Ji
2023/0030225 A1 * 2/2023 Lee ...................... G09G 3/3426

FOREIGN PATENT DOCUMENTS

CN 101436376 A 5/2009
CN 101937653 A 1/2011
CN 106409206 A 2/2017
CN 110910822 A 3/2020
(Continued)

OTHER PUBLICATIONS

The First Office Action and search report dated Mar. 14, 2024 for Chinese Application No. 202310090265.4, 9 pages.

*Primary Examiner* — Grant Sitta
(74) *Attorney, Agent, or Firm* — East IP P.C.

(57) ABSTRACT

The present application discloses a method, apparatus and apparatus device for performing brightness attenuation compensation of a display panel. The method includes: acquiring a first light-emitting count value corresponding to a first light-emitting block and count offset values corresponding to the light-emitting blocks; determining a brightness difference between each of the light-emitting blocks and the first light-emitting block based on the first light-emitting count value, the count offset values corresponding to the light-emitting blocks and a first correspondence; and performing brightness attenuation compensation of each of the light-emitting blocks based on the brightness difference between each of the light-emitting blocks and the first light-emitting block.

15 Claims, 8 Drawing Sheets

(56) References Cited

FOREIGN PATENT DOCUMENTS

| | | | |
|---|---|---|---|
| CN | 111063320 | A | 4/2020 |
| CN | 111402797 | A | 7/2020 |
| CN | 112863439 | A | 5/2021 |
| CN | 113470564 | A | 10/2021 |
| CN | 114503186 | A | 5/2022 |
| CN | 114564161 | A | 5/2022 |
| CN | 114694617 | A | 7/2022 |
| EP | 3671710 | A1 | 6/2020 |
| KR | 20140140941 | A | 12/2014 |
| WO | 2017056648 | A1 | 4/2017 |

* cited by examiner

METHOD, APPARATUS, AND DEVICE FOR PERFORMING BRIGHTNESS ATTENUATION COMPENSATION OF A DISPLAY PANEL

CROSS-REFERENCE TO RELATED APPLICATION

The present application claims priority to Chinese Patent Application No. 202310090265.4, filed on Jan. 17, 2023, which is incorporated herein by reference in its entirety.

TECHNICAL FIELD

The present application relates to the field of display technology, in particular to method, apparatus, and device for performing brightness attenuation compensation of a display panel.

BACKGROUND

Currently, a display panel typically includes a plurality of light-emitting pixels arranged in an array, and each of the light-emitting pixels includes a pixel circuit and light-emitting elements. The pixel circuit typically includes thin film transistors (TFTs) and capacitors. The light-emitting element typically includes an organic light-emitting diodes (OLEDs) or any other light-emitting device.

During a display process of the display panel, light-emitting brightness of the light-emitting element will continuously decrease as light-emitting materials of the light-emitting element are used for light-emitting. That is, light-emitting brightness of the light-emitting pixel will decreases with increase in time for light-emitting. In related arts, as shown in FIG. 1, in order to avoid brightness reduction of the light-emitting pixel which would otherwise affects display effects, brightness of the light-emitting pixel is compensated by increasing a driving current with an initial brightness LO as a compensation target at certain intervals. However, an increased driving current will lead to a further increase in a brightness attenuation rate of the light-emitting materials, resulting in a decrease in an actual service life of the light-emitting pixel, which will affect a service life of the display panel.

SUMMARY

The embodiments of the present application provides a method, apparatus, and device for performing brightness attenuation compensation of a display panel, which can solve a technical problem that brightness compensation of light-emitting pixels would affects service life of the display panel.

In a first aspect, the embodiments of the present application provides a method for performing brightness attenuation compensation of a display panel, a display area of which comprises a plurality of light-emitting blocks. The method includes: acquiring a first light-emitting count value corresponding to a first light-emitting block and count offset values corresponding to the light-emitting blocks; determining a brightness difference between each of the light-emitting blocks and the first light-emitting block based on the first light-emitting count value, the count offset values corresponding to the light-emitting blocks and a first correspondence which represents a negative correlation relationship between a light-emitting count value and light-emitting brightness; and performing brightness attenuation compensation of each of the light-emitting blocks based on the brightness difference between each of the light-emitting blocks and the first light-emitting block.

In a second aspect, the embodiments of the present application provides an apparatus for performing brightness attenuation compensation of a display panel, a display area of which comprises a plurality of light-emitting blocks. The apparatus includes: an acquisition module configured to acquire a first light-emitting count value corresponding to a first light-emitting block and count offset values corresponding to the light-emitting blocks; a determination module configured to determine a brightness difference between each of the light-emitting blocks and the first light-emitting block based on the first light-emitting count value, the count offset values corresponding to the light-emitting blocks and a first correspondence which represents a negative correlation relationship between a light-emitting count value and light-emitting brightness; and a compensation module configured to perform brightness attenuation compensation of each of the light-emitting blocks based on the brightness difference between each of the light-emitting blocks and the first light-emitting block.

In a third aspect, the embodiments of the present application provides a device for performing brightness attenuation compensation of a display panel. The device for performing brightness attenuation compensation of a display panel includes: a processor; and a memory for storing computer program instructions, wherein the processor is configured to execute the computer program instructions to implement a method for performing brightness attenuation compensation of a display panel according to the first aspect; or the computer program instructions are stored on the device for performing brightness attenuation compensation of a display panel, and when the computer program instructions are executed by a processor to implement a method for performing brightness attenuation compensation of a display panel according to the first aspect.

BRIEF DESCRIPTION OF THE DRAWINGS

In order to more clearly illustrate technical solutions of the embodiments of the present application, a brief introduction will be made to the drawings required in the embodiments of the present application. Obviously, the drawings described below are only some embodiments of the present application. For those skilled in the art, other drawings can be obtained from these drawings without any inventive efforts.

DETAILED DESCRIPTION

The features and exemplary embodiments of various aspects of the present application will be described in detail below. In order to make the purpose, technical solutions and advantages of the present application clearer, the present application will be further described in detail below in conjunction with the accompanying drawings and specific embodiments. It should be understood that the specific embodiments described herein are only intended to explain the present application, not to limit it. For those skilled in the art, the present application can be implemented without requiring some of these specific details. The following description of the embodiments is only intended to provide a better understanding of the present application by illustrating examples of the present application.

It should be noted that in this document, relational terms such as first and second are only used to distinguish one entity or operation from another entity or operation, and do not necessarily require or imply any such actual relationship or order between these entities or operations. Moreover, the terms “include”, “comprise”, or any other variation thereof are intended to cover non-exclusive inclusion, such that a process, method, article, or device that includes a series of elements includes not only those elements, but also other elements that are not explicitly listed, or also elements inherent in such a process, method, article, or device. Without further restrictions, the elements defined by the statement “including . . . ” do not exclude the existence of other elements in the process, method, article, or device that includes the elements.

It should be noted that the embodiments and features in the embodiments of the present application can be combined with each other without conflict. The embodiments will be described in detail below in conjunction with the accompanying drawings.

Currently, a display panel typically includes a plurality of light-emitting pixels arranged in an array, and each of the light-emitting pixels includes a pixel circuit and light-emitting elements. The pixel circuit typically includes thin film transistors (TFTs) and capacitors. The light-emitting element typically includes an organic light-emitting diodes (OLEDs) or any other light-emitting device.

Figure 1:
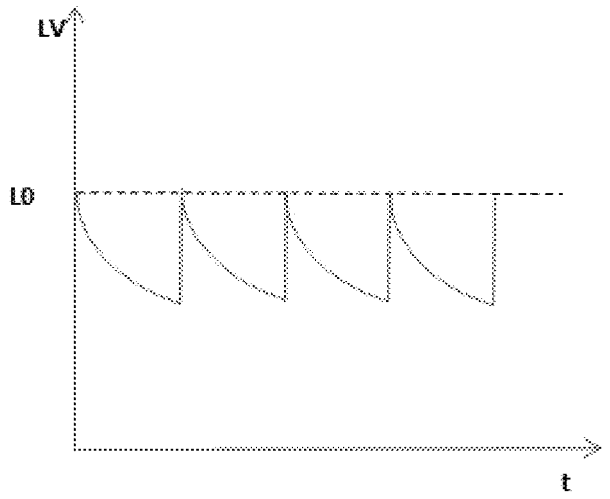
FIG. 1 is a schematic diagram of brightness compensation based on initial brightness according to related arts.

During a display process of the display panel, light-emitting brightness of the light-emitting element will continuously decrease as light-emitting materials of the light-emitting element are used for light-emitting. That is, light-emitting brightness of the light-emitting pixel will decreases with increase in time for light-emitting. In related arts, as shown in FIG. 1, in order to avoid brightness reduction of the light-emitting pixel which would otherwise affects display effects, brightness of the light-emitting pixel is compensated by increasing a driving current with an initial brightness LO as a compensation target at certain intervals. However, an increased driving current will lead to a further increase in a brightness attenuation rate of the light-emitting materials, resulting in a decrease in an actual service life of the light-emitting pixel, which will affect a service life of the display panel.

In order to solve the above technical problem, the embodiments of the present application provides a method, apparatus, and device for performing brightness attenuation compensation of a display panel. The following will first introduce the display panel according to the embodiments of the present application.

Figure 2:
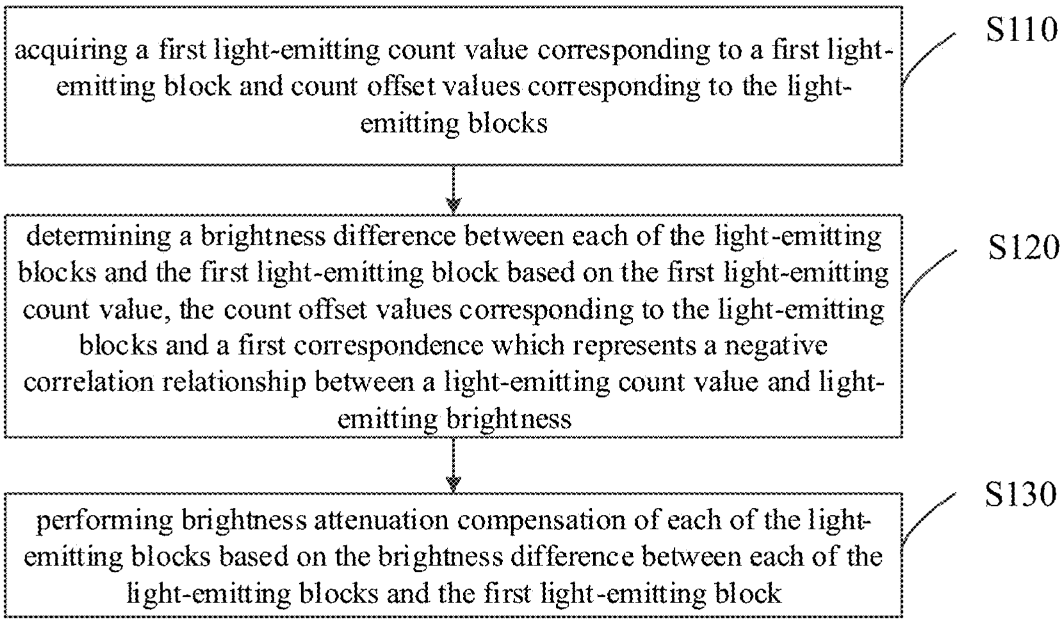
FIG. 2 is a flowchart illustrating a method for performing brightness attenuation compensation of a display panel according to an embodiment of the present application.

FIG. 2 is a flowchart illustrating a method for performing brightness attenuation compensation of a display panel according to an embodiment of the present application. The display panel includes a plurality of light-emitting blocks in its display area. The method for performing brightness attenuation compensation of a display panel includes: S110, acquiring a first light-emitting count value corresponding to a first light-emitting block and count offset values corresponding to the light-emitting blocks; S120, determining a brightness difference between each of the light-emitting blocks and the first light-emitting block based on the first light-emitting count value, the count offset values corresponding to the light-emitting blocks and a first correspondence which represents a negative correlation relationship between a light-emitting count value and light-emitting brightness; and S130, performing brightness attenuation compensation of each of the light-emitting blocks based on the brightness difference between each of the light-emitting blocks and the first light-emitting block.

The method for performing brightness attenuation compensation of a display panel according to the embodiment of the present application is applicable to a device for performing brightness attenuation compensation of a display panel. The device can determine brightness difference between each of the light-emitting blocks and the first light-emitting block based on the first light-emitting count value and the count offset values corresponding to the light-emitting blocks, and perform respective brightness attenuation compensation of each of the light-emitting blocks. The display panel may be a PC, TV, display, mobile terminal, tablet computer, wearable device, and the like. The specific form of the display panel is not limited in the embodiment.

In the embodiment, by dividing a display area of a display screen into a plurality of light-emitting blocks, the first light-emitting count value corresponding to the first light-emitting blocks and the count offset values corresponding to light-emitting blocks other than the first light-emitting block can be stored in a storage module. Based on the count offset values of the light-emitting blocks and the first light-emitting count value, a brightness difference between each of the light-emitting blocks and the first light-emitting block can be determined, and then brightness attenuation compensating for each of the light-emitting blocks can be performed based on the brightness difference. Through brightness attenuation compensating for each of the light-emitting blocks with reference to the first light-emitting block, display uniformity of the display panel is ensured and uneven display at different display areas is avoid. Moreover, since each of the light-emitting blocks is compensated in regard of brightness attenuation with reference to the first light-emitting block which also undergoes attenuation due to aging, compensation amplitude of a driving current is reduced compared with compensation based on an initial brightness, so as to avoid a problem of increased brightness attenuation and shortened service life which would otherwise occur if the driving current is increased, and thus improve overall life of the display panel.

At S110, the display panel may include a plurality of light-emitting blocks in its display area, and each of the light-emitting blocks may include the same or different number of light-emitting pixels. When the display panel display images, a first light-emitting block is determined from the plurality of light-emitting blocks, and a first light-emitting count value corresponding to the first light-emitting block is acquired. The display panel can also acquire count offset values corresponding to respective light-emitting blocks.

The display panel can directly retrieves the first light-emitting count value corresponding to the first light-emitting blocks from a storage module, and retrieves the count offset values corresponding to the other light-emitting blocks.

Light-emitting count values corresponding to the other light-emitting blocks can be calculated and obtained based on the first light-emitting count value and the count offset values. For example, the display area of the display panel can be divided into n light-emitting blocks, including 1 first light-emitting block and the other n−1 light-emitting blocks. The storage module stores the first light-emitting count value of the first light-emitting blocks and n−1 count offset values corresponding to the other n−1 light-emitting blocks. For each of the other n−1 light-emitting blocks, its actual light-emitting count value is a sum of the first light-emitting count value of the first light-emitting block and the count offset value corresponding to the light-emitting block. According to the first light emitting count value of the first light-emitting block and the n−1 count offset values, the light-emitting count values corresponding to the n−1 light-emitting blocks can be obtained by adding the first light emitting count value with the respective n−1 count offset values.

As an embodiment, the first light-emitting count value and the count offset values are stored in the storage module of the display panel, and a storage space occupied by the first light-emitting value is larger than a storage space occupied by the count offset value.

The light-emitting count value of a light-emitting block has a positive correlation with light-emitting brightness and time for light-emitting of the light-emitting block. As display time of the display panel continues to increase, the light-emitting count value of a light-emitting block will continue to accumulate. Therefore, when designing the storage space for the light-emitting count value, it is necessary to consider an overall service life of the display panel and ensure that there will be no data overflow in the storage space for the light-emitting count value within the service life of the display panel. Therefore, the storage space for the light-emitting count value is usually set with a relatively large spare space, and may be a storage size of 24 bits, 30 bits, or higher.

During a display process of the display panel, all the light-emitting count values of the light-emitting blocks are constantly increasing, with just a certain difference in the increasing speed. Therefore, deviation values among the light-emitting count values of the light-emitting blocks will be much smaller than data values of the light-emitting count values themselves. A storage space required for the deviation values in the case where the deviation values of the light-emitting count values are stored will be much smaller than a storage space required for the light-emitting count values.

By storing count offset values of the light-emitting blocks and calculating the light-emitting count values of the light-emitting blocks based on the first light-emitting count value and the count offset values corresponding to the respective light-emitting blocks, the light-emitting count values of the light-emitting blocks can also be obtained. For example, among the n light-emitting blocks divided in the display area, based on the first light-emitting count value of the first light-emitting block and the count offset values corresponding to the n−1 light-emitting blocks, the first light-emitting count value can be added with the respective n−1 count offset values to obtain the light-emitting count values corresponding to the n−1 light-emitting blocks. In this way, a storage space required for the n light-emitting blocks of the display panel includes a storage space for one light-emitting count value and n count offset values.

In an implementation, the storage space for storing the light-emitting count value may be set to 24 bits, and the storage space for storing the count offset value may be set to 12 bits. That is, a storage space required for directly storing n light-emitting count values is 24*n bits, while a storage space for storing 1 light-emitting count value and n count offset values is 24+12*n=(12*n+24) bit.

It should be understood that when there is a large number of light-emitting blocks, using such a storage method for 1 light-emitting count value and n count offset values can greatly save storage space.

It should be noted that in a case where the size of the storage space for storing the light-emitting count values is given in advance by design, a storage space that can be allocated to the light-emitting value when storing the light-emitting count value and n count offset values is larger than a storage space allocated when directly storing n light-emitting count values, thereby making the storage space for the light-emitting count value larger by such storage method and enabling realization of light-emitting counting for a longer time.

Compared with the case where n first light-emitting values are directly stored, since a storage space for a count offset value is smaller than a storage space for a light-emitting count value, it can effectively reduce an overall storage space required for storing the light-emitting count values, thereby reducing the data size of the light-emitting count values, and saving the storage space of the display panel.

As an embodiment, the step S110 may include: retrieving the first light emitting count value and the count offset values corresponding to the light-emitting blocks from the storage module when the display panel is powered on.

In the embodiment, the display panel can retrieve the first light emitting count value and the count offset values corresponding to the light-emitting blocks from the storage module every time when the display panel is powered on, and brightness attenuation compensation for each of the light-emitting blocks can then be performed using a compensation method described in the following embodiments.

During a normal display process of the display panel, the light-emitting count values corresponding to the light-emitting blocks will be continuously accumulated with light-emitting brightness and time for light-emitting. If the display panel acquires the continuously changing first light-emitting count values and the count offset values in real time, it would require retrieve of a large amount of data. It should be understood that during a display process from power-on to power-off of the display panel, the light-emitting count values of the light-emitting blocks are continuously accumulated, but a change in the light-emitting count value during a mere power-on process is relatively smaller than the light-emitting count value itself. That is, an aging degree of the light-emitting element is relatively small during display in a mere power-on process of the display panel. Using the brightness differences among the light-emitting blocks when the display device is powered on to perform brightness attenuation compensation for an entire power-on period will not cause a significant brightness deviation.

During a power-on process of the display panel, the first light-emitting count value and the count offset values corresponding to the light-emitting blocks are retrieved, and then a brightness difference of each of the light-emitting blocks is determined based on the retrieved data. Even if the light-emitting count values of the light-emitting blocks change during a display process of the display panel, it is possible to continue to perform brightness attenuation compensate for each of the light-emitting blocks using the brightness difference between each of the light-emitting blocks and the first light-emitting block determined during the power on process.

Figure 3:
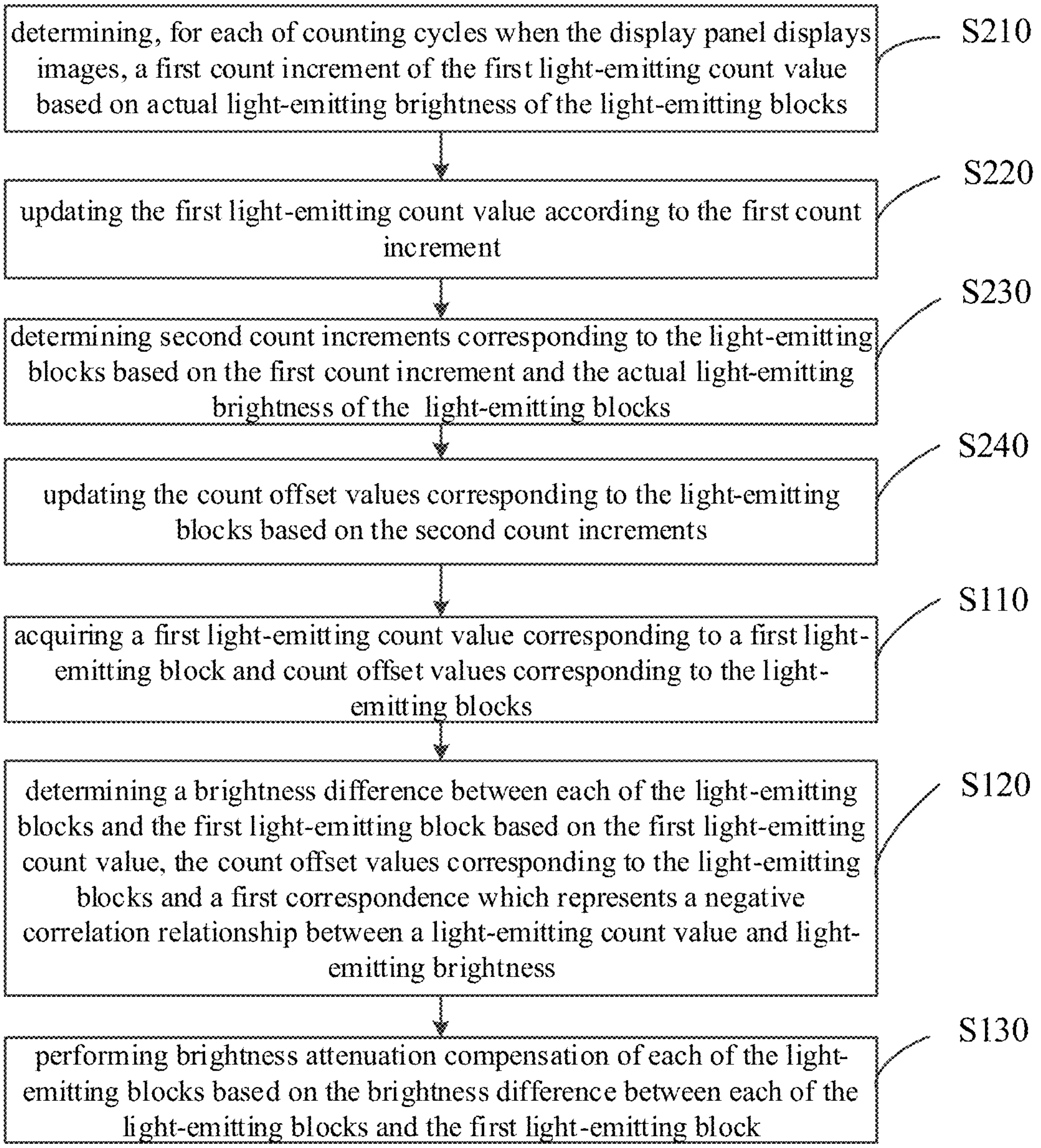
FIG. 3 is a flowchart illustrating a method for performing brightness attenuation compensation of a display panel according to another embodiment of the present application.

As an embodiment, referring to FIG. 3, before S110, the method may further include: S210, determining, for each of counting cycles when the display panel displays images, a first count increment of the first light-emitting count value based on actual light-emitting brightness of the light-emitting blocks; S220, updating the first light-emitting count value according to the first count increment; S230, determining second count increments corresponding to the light-emitting blocks based on the first count increment and the actual light-emitting brightness of the light-emitting blocks; and S240, updating the count offset values corresponding to the light-emitting blocks based on the second count increments.

In the embodiment, in a single counting cycle, the first count increment of the first light emitting count value can be determined based on the actual light-emitting brightness of the light-emitting blocks, and the first light-emitting count value is updated based on the first count increment, and then the count offset values corresponding to the light-emitting blocks can be updated.

At S210, the display panel obtains the first light-emitting count value and the count offset values corresponding to the light-emitting blocks in order to determine the brightness difference of the respective light-emitting blocks based on these data, thereby performing targeted brightness attenuation compensation. In order to ensure that the light-emitting count value of each light-emitting block has a correlation relationship with light-emitting brightness and time for light-emitting of the light-emitting block, the first count increment of the first light-emitting count value can be determined based on the actual light-emitting brightness of the light-emitting blocks within the counting cycle when the display panel display images.

The light-emitting count values of the light-emitting blocks are calculated based on the first light-emitting count value and the count offset values corresponding to the light-emitting blocks, so it is necessary to update the first light-emitting count value in real time during image display of the display panel.

As an implementation, the first light-emitting count value may be updated only based on the actual light-emitting brightness of the first light-emitting block in each counting cycle. For example, in a single counting cycle, if a first count increment corresponding to the actual light-emitting brightness of the first light-emitting block is 12, the first count increment of the first light-emitting count value is 12. Therefore, the updated first light-emitting count value increases by 12.

It should be understood that in the above implementation, the change in the first light-emitting count value is only related to the actual light-emitting brightness of the first light-emitting block. After subsequently determining the brightness difference between each of the light-emitting blocks and the first light-emitting block, brightness compensation for each of the light-emitting blocks should be performed by taking the predetermined first light-emitting block as a reference.

As another implementation, it is also possible to determine whether the first light-emitting block has be changed based on the actual light-emitting brightness of the light-emitting blocks in each counting cycle.

If the first light-emitting block has not changed, the first count increment of the first light-emitting count value is the count increment corresponding to the actual light-emitting brightness of the first light-emitting block.

If the first light-emitting block has changed, e.g. it is updated from an original light-emitting block to one of the other light-emitting blocks, then the first count increment of the first light-emitting count value is associated with both the count increment corresponding to the new first light-emitting block and the count increment corresponding to the old first light-emitting block.

Figure 4:
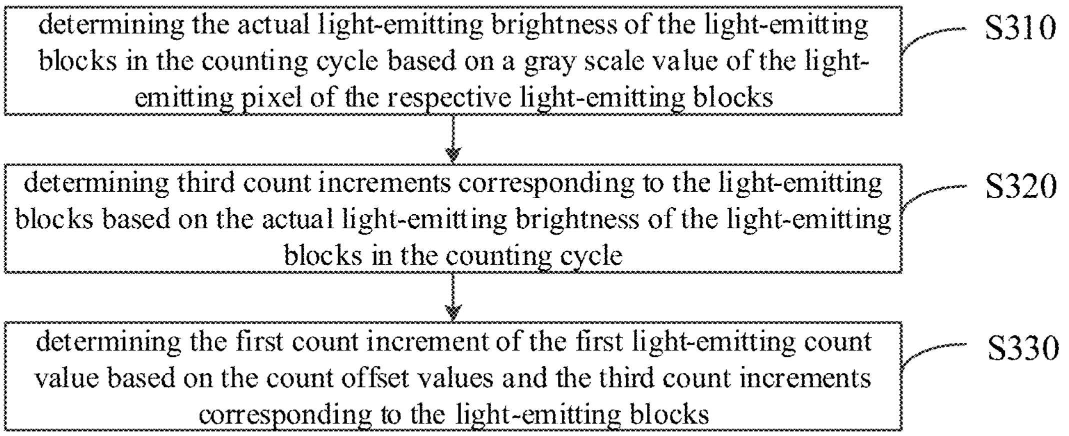
FIG. 4 is a detailed flow diagram of S210 of the method for performing brightness attenuation compensation of a display panel according to an embodiment of the present application.

As an embodiment, referring to FIG. 4, the light-emitting block may include at least one light-emitting pixel, and the above S210 may include: S310, determining the actual light-emitting brightness of the light-emitting blocks in the counting cycle based on a gray scale value of the light-emitting pixel of the respective light-emitting blocks; S320, determining third count increments corresponding to the light-emitting blocks based on the actual light-emitting brightness of the light-emitting blocks in the counting cycle; and S330, determining the first count increment of the first light-emitting count value based on the count offset values and the third count increments corresponding to the light-emitting blocks.

In the embodiment, for the respective light-emitting blocks, the light-emitting brightness of each light-emitting pixel can be determined based on a gray scale value of the light-emitting pixel, and then the actual light-emitting brightness of each of the light-emitting blocks within the counting cycle can be determined based on the light-emitting brightness of the light-emitting pixel. From a correspondence between actual light-emitting brightness and third count increments, third count increments corresponding to the light-emitting blocks can be determined. According to the third count increments corresponding to the light-emitting blocks including the first light-emitting block and the count offset values of the light-emitting blocks, the first count increment of the first light emitting count value within the counting cycle can be determined.

At S310, among the plurality of light-emitting blocks divided in the display area of the display panel, each light-emitting block may include at least one light emitting pixel. Taking a single light-emitting block as an example, there is a plurality of light-outputting frames within a single counting cycle, and the display panel may obtain a gray scale values of light-emitting pixel of the light-emitting block in each of the light-outputting frames.

According to gray scale values of the light-emitting pixel in different light-outputting frames, the actual light-emitting brightness of the light-emitting block within the counting cycle can be calculated based on a corresponding between gray scale values and brightness. In an implementation, the actual brightness of each light-emitting pixel in different light-outputting frames can be determined based on gray scale values of the light-emitting pixel in different light-outputting frames in the counting cycle, and an average brightness value of the light-emitting pixel in the counting cycle is then calculated. After calculating the average brightness of each light-emitting pixel, the actual light-emitting brightness of the light-emitting block is then determined.

In another implementation, the actual brightness of the light-emitting block within a single light-outputting frame can be determined based on a gray scale value of the light-emitting pixel in the single light-outputting frame. After calculating the actual brightness of the light-emitting block in each of the light-outputting frames, the actual light-emitting brightness of the light-emitting block in the counting cycle can then be determined.

As an implementation, the counting cycle may be 1 second. When the display panel has a refresh rate of 60 Hz, there is 60 light-outputting frames in a single counting cycle.

At S320, after determining the actual light-emitting brightness of each of the light-emitting block in the counting cycle, the third counting increments corresponding to the light-emitting blocks can be determined based on the actual light-emitting brightness.

The actual light-emitting brightness of a light-emitting block in the counting cycle has a positive correlation with the third counting increment. The greater the actual light-emitting brightness, the greater the third counting increment corresponding to the light-emitting block. For example, the third count increment in a single counting cycle may be stored in 4 bits, and in this case a numerical range of the third count increment may be [0, 15]. That is, when the actual light-emitting brightness of the light-emitting block is 0 or close to 0, the third counting increment of the light-emitting block in the counting cycle is 0; and when the actual light-emitting brightness of the light-emitting block is the highest light-emitting brightness, the third counting increment of the light-emitting block in the counting cycle is 15.

By dividing the actual light-emitting brightness into multiple brightness ranges, each brightness range can be corresponding to a value in the third count increment. Based on a brightness range to which the actual light-emitting brightness of the light-emitting block belongs, the third count increment of the light-emitting block in the counting cycle can be determined. For example, when the brightness range corresponding to the actual light-emitting brightness of a light-emitting block is the maximum brightness range, the third counting increment of the light-emitting block in the counting cycle is 15; and when the brightness range corresponding to the actual light-emitting brightness of a light-emitting block is in a medium brightness range, the third count increment of the light-emitting block in the counting cycle may be 8.

It should be understood that magnitude of a brightness interval of different brightness ranges may be the same or different.

At S330, after determining the third count increments of the light-emitting blocks in the counting cycle, the first count increment of the first light-emitting count value can be determined based on the count offset values and the third count increments of the light-emitting blocks.

In an implementation, a light-emitting block among the plurality of light-emitting blocks with the largest light-emitting count value may be selected as the first light-emitting block. Therefore, after each counting cycle, it is necessary to determine whether the first light-emitting block needs to be updated based on the light-emitting count values corresponding to the first light-emitting block and the light-emitting count values corresponding to other light-emitting blocks. If the light-emitting count value of the original first light-emitting block is still the maximum light-emitting count value, there is no need to update the first light-emitting block; and if the light-emitting count value of the original first light-emitting block is smaller than a light-emitting count value of a certain light-emitting block, it is necessary to update the first light-emitting block to be the light-emitting block that exceeds the original first light-emitting block.

In an example where the first light-emitting block does not need to be updated, the light-emitting block P1 is the original first light-emitting block, and the light-emitting block P2 is one of the other light-emitting blocks. The first light-emitting count value corresponding to the light-emitting block P1 is 1000, and the count offset value corresponding to the light-emitting block P2 is −10, that is, the light-emitting count value corresponding to the light-emitting block P2 is 990.

In a single counting cycle, the third count increment of the light-emitting block P1 is 5, and the third count increment of the light-emitting block P2 is 15. After this counting cycle, the light-emitting count value of the light-emitting block P1 is 1005, and the light-emitting count value of the light-emitting block P2 is 1005. At this time, the first light-emitting block does not need to be updated because the light-emitting count value of the light-emitting block P2 does not exceed the light-emitting block P1.

When the first light-emitting block does not need to be updated, the first count increment of the first light-emitting count value is the third count increment corresponding to the first light-emitting block.

In the implementation, since the light-emitting count value of the first light-emitting block remains the maximum light-emitting count value after the counting cycle, it is not necessary to update the first light-emitting block. At this time, the first count increment of the first light-emitting count value is the third count increment corresponding to the first light-emitting block.

In an example where the first light-emitting block needs to be updated, the light-emitting block P1 is the original first light-emitting block, and the light-emitting block P2 is one of the other light-emitting blocks. The first light-emitting count value corresponding to the light-emitting block P1 is 1000, and the count offset value corresponding to the light-emitting block P2 is −10, that is, the light-emitting count value corresponding to the light-emitting block P2 is 990.

In a single counting cycle, the third count increment of the light-emitting block P1 is 2, and the third count increment of the light-emitting block P2 is 15. After this counting cycle, the light-emitting count value of the light-emitting block P1 is 1002, and the light-emitting count value of the light-emitting block P2 is 1005. At this time, since the light-emitting count value of the light-emitting block P2 exceeds the light-emitting block P1, it is necessary to update the first light-emitting block to be the light-emitting block P2.

When updating the first light-emitting block to be the light-emitting block P2, the original first light emitting count value is 1000, and the new first light-emitting count value is 1005, so it can be determined that the first count increment of the first light-emitting count value at this time is 5.

In this implementation, since there are other light-emitting block whose light-emitting count value is higher than the original first light-emitting block after the counting cycle, it is necessary to update the first light-emitting block to a new light-emitting block and then determine the first count increment of the first light-emitting count value.

It should be noted that in the above implementations, only the light-emitting block P1 and the light-emitting block P2 are exemplified, and whether the first light-emitting block needs to be updated is determined based on the light-emitting count values of the light-emitting blocks P1 and P2. When the display panel includes multiple light-emitting blocks, it is also necessary to compare each of the light-emitting blocks with the first light-emitting block to determine whether the first light-emitting block needs to be updated.

Figure 5:
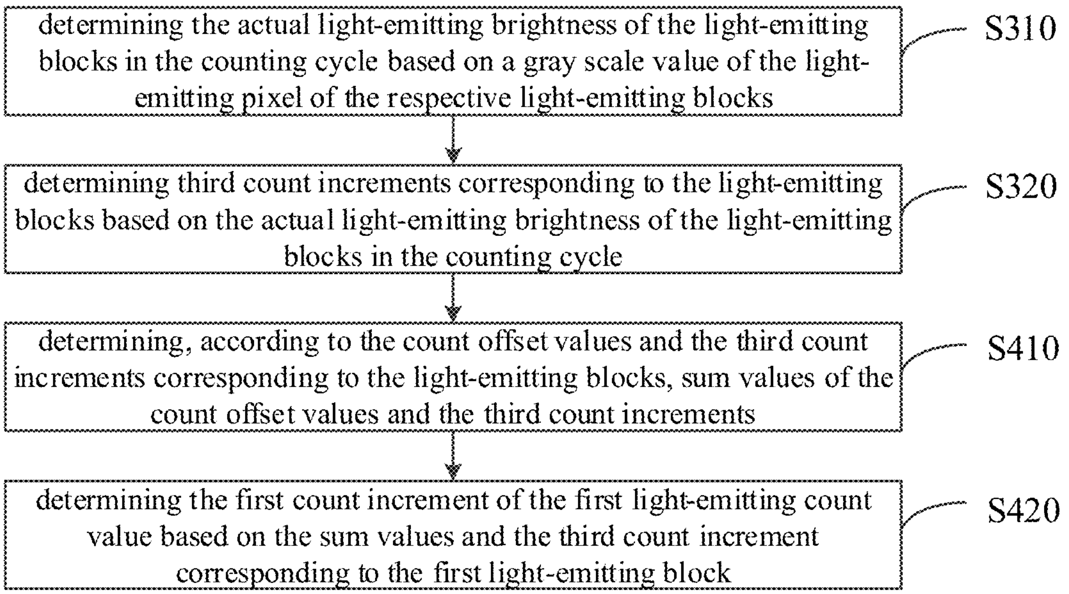
FIG. 5 is a detailed flow diagram of S210 of the method for performing brightness attenuation compensation of a display panel according to another embodiment of the present application.

As an embodiment, referring to FIG. 5, where the count offset value corresponding to the first light-emitting block is zero, and the above S330 may include: S410, determining, according to the count offset values and the third count increments corresponding to the light-emitting blocks, sum values of the count offset values and the third count increments; and S420, determining the first count increment of the first light-emitting count value based on the sum values and the third count increment corresponding to the first light-emitting block.

In this embodiment, for each light-emitting block, the sum value of the count offset value and the third count increment can be calculated based on the count offset value before the current counting cycle and the third count increment corresponding to the current counting cycle. Since the count offset value of the first light-emitting block is 0, the sum value for the first light-emitting block is the third count increment corresponding to the first light-emitting block. According to the sum value corresponding to each light-emitting block and the third count increment corresponding to the first light-emitting block, the first count increment of the first light-emitting count value within the current counting cycle can be determined.

At S410, in order to reduce computational resource consumption for calculation of the first count increment of the first light-emitting count value, it is not necessary to calculate, when comparing the magnitude of the light-emitting count values among the light-emitting blocks, all the light-emitting count values of the light-emitting blocks, but to compare with the first light-emitting block based on the count offset values and the third count increments of the light-emitting blocks.

In a single counting cycle, after determining the third counting increments corresponding to the light-emitting blocks, the count offset values of the light-emitting blocks can be used for calculating the sum values of the count offset values and the third count increments of the light-emitting blocks.

When the first light-emitting block is the light-emitting block with the largest light-emitting count value among the plurality of light-emitting blocks, the count offset values of the other light-emitting blocks relative to the first light-emitting count value should be less than or equal to 0.

According to the sum values of the count offset values and the third count increments of the light-emitting blocks, new count offset values corresponding to the light-emitting blocks can be determined if the first light-emitting count value remains unchanged.

It should be understood that whether the first light-emitting block needs to be updated can be determined according to the third count increment of the first light-emitting block and the new count offset values corresponding the light-emitting blocks.

At S420, after calculating the sum value of the count offset value and the third count increment of a certain light-emitting block, the sum value can be compared with the third count increment corresponding to the first light-emitting block.

If the third count increment of the first light-emitting block is greater than or equal to the sum value, it indicates that after the counting cycle, the light-emitting count value of the first light-emitting block is still greater than the light-emitting block. At this time, the first light-emitting block needs not be updated, and the first count increment of the first light-emitting count value is determined as the third count increment of the first light-emitting block.

If the third count increment of the first light-emitting block is less than the sum value, it indicates that after the counting cycle, the light-emitting count value of the first light-emitting block will be smaller than the light-emitting block. At this time, the first light-emitting block needs to be updated to a new light-emitting block, and the first count increment of the first light-emitting count value is determined as the sum value of the count offset value and the third count increment of the new light-emitting block.

In an implementation, take the light-emitting block being P2, the count offset value corresponding to the light-emitting block P2 being −10, and the third count increment of the light-emitting block P2 being 15 as an example, the new count offset corresponding to the light-emitting blocks P2 is 5 if the first light-emitting count value remains unchanged.

If the light-emitting block P1 is the first light-emitting block and the third count increment in this counting cycle is less than 5, the light-emitting count value of the light-emitting block P2 will exceed the light-emitting count value of the light-emitting block P1, resulting in the need for the first light-emitting block to be updated. At this time, the updated first light-emitting block is the light-emitting block P2, and the first count increment of the first light emitting count value is the sum value of the count offset value and the third count increment of the light-emitting block P2.

If the light-emitting block P1 is the first light-emitting block and the third count increment in this counting cycle is greater than or equal to 5, the light-emitting count value of the light-emitting block P2 will not exceed the light-emitting count value of the light-emitting block P1, and the first light-emitting block does not need to be updated at this time. The first light-emitting block continues to be the light-emitting block P1, and the first count increment of the first light emitting count value is the third count increment of the light-emitting block P1.

Figure 6:
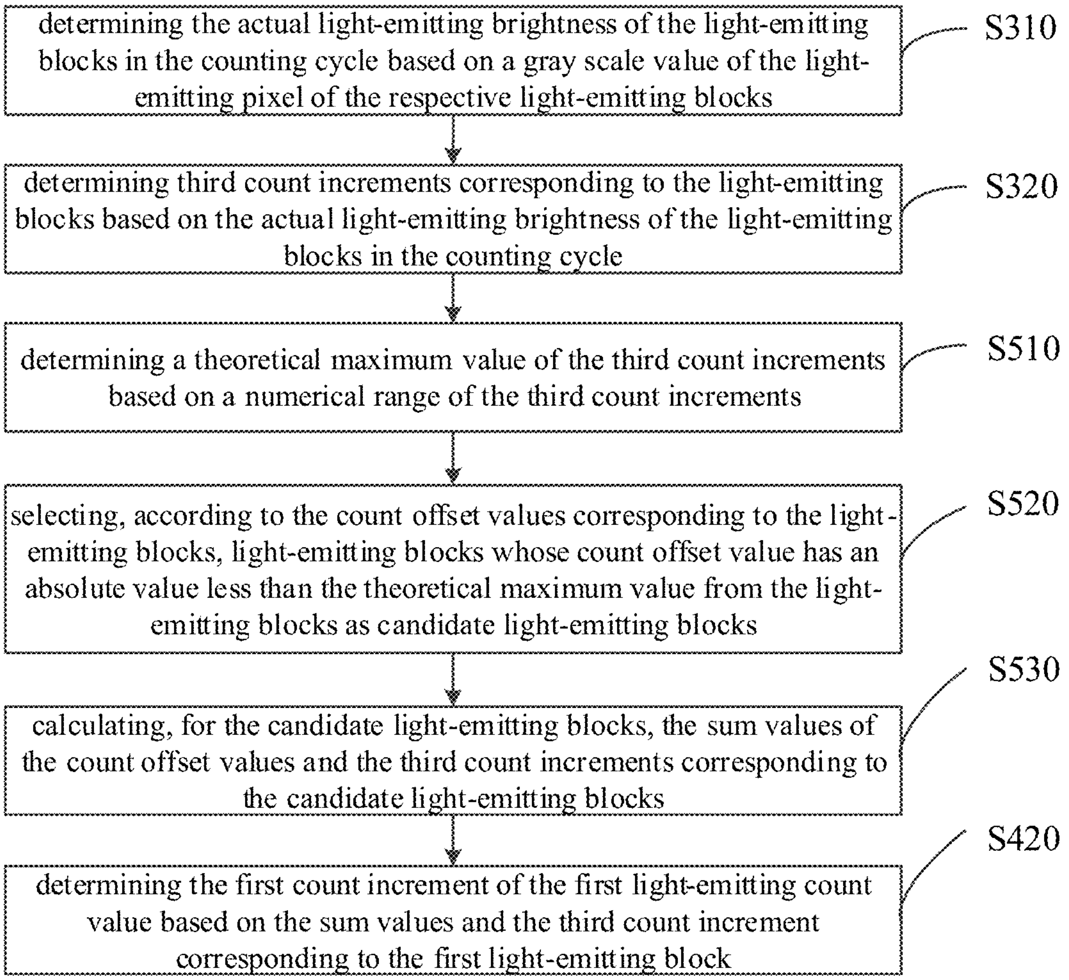
FIG. 6 is a detailed flow diagram of S210 of the method for performing brightness attenuation compensation of a display panel according to another embodiment of the present application.

As an embodiment, referring to FIG. 6, the above S410 may include: S510, determining a theoretical maximum value of the third count increments based on a numerical range of the third count increments; S520, selecting, according to the count offset values corresponding to the light-emitting blocks, light-emitting blocks whose count offset value has an absolute value less than the theoretical maximum value from the light-emitting blocks as candidate light-emitting blocks; and S530, calculating, for the candidate light-emitting blocks, the sum values of the count offset values and the third count increments corresponding to the candidate light-emitting blocks.

In this embodiment, among the light-emitting blocks, candidate light-emitting blocks whose light-emitting count value exceeds the first light-emitting block in this counting cycle can be selected based on the count offset values. Comparing the sum values of the candidate light-emitting blocks with the first light-emitting block enables reduction of the number of comparisons and thus computational resources consumed during the comparison process.

At S510, within a single counting cycle, for each light-emitting block, a corresponding third count increment can be determined from a numerical range of third count increments based on actual light-emitting brightness of the light emitting block.

By dividing the actual light-emitting brightness into multiple brightness ranges, each brightness range can be corresponding to a value in the third count increment. Based on a brightness range corresponding to the actual light-emitting brightness of the light-emitting block, the third count increment of the light-emitting block within the counting cycle can be determined.

When the actual light-emitting brightness of a light-emitting block corresponds to the maximum brightness range, the third count increment corresponding to the light-emitting block has the maximum value, which is the theoretical maximum value of the third count increments. For example, when the numerical range of the third count increments is [0, 15], the theoretical maximum value of the third count increments is 15.

At S520, a deviation value of each of the light-emitting blocks from the light-emitting count value of the first light-emitting block before this counting cycle can be determined based on the count offset values of the light-emitting blocks. At this time, candidate light-emitting blocks whose count offset value has an absolute value less than the theoretical maximum value can be selected from of the plurality of light-emitting blocks.

When the first light-emitting block is selected to be the light-emitting block with the largest light-emitting count value among the plurality of light-emitting blocks, the count offset values of the other light-emitting blocks relative to the first light-emitting count value should be less than or equal to 0. That is, a deviation value between the light-emitting count values of the first light-emitting block and the candidate light-emitting block is smaller than the theoretical maximum value of the third count increments in the counting cycle.

The third count increment corresponding to the candidate light-emitting block selected from the plurality of light-emitting blocks in the counting cycle may be greater than the absolute value of the count offset value. Therefore, the candidate light-emitting blocks are light-emitting blocks that may replace the original first light-emitting block in the counting cycle. For example, taking the light-emitting block P1, the light-emitting block P2, and the light-emitting block P3, wherein the light-emitting block P1 is the first light-emitting block, the count offset value corresponding to the light-emitting block P2 is −10, and the count offset corresponding to the light-emitting block P3 is −20 as an example. At this time, the absolute value of the count offset value of the light-emitting block P2 is 10, and the absolute value of the count offset value of the light-emitting block P3 is 20. The light-emitting block P2 may be determined as the candidate light-emitting block with the third count increment having the theoretical maximum value of 15.

It should be understood that for those light-emitting blocks other than the candidate light-emitting blocks, even if their actual light-emitting brightness within the counting cycle corresponds to the theoretical maximum value of the third count increments, its light-emitting count value after the counting cycle will not exceed the light-emitting count value of the first light-emitting block before the counting cycle. For example, when the actual light-emitting brightness of the light-emitting block P3 reaches the maximum within the counting cycle, its count offset value after the counting cycle is still −5, that is, the light-emitting value of the light-emitting block P3 will still be smaller than the light-emitting value of the light-emitting block P1 before the counting cycle, and therefore the light-emitting block P3 cannot become a new first light-emitting block.

In order to reduce computational resources, when determining whether to update the first light-emitting block from among the plurality of light-emitting blocks, the candidate light-emitting block can be determined from the plurality of light-emitting blocks in advance, and compared with the first light-emitting block, so as to determine whether to update the first light-emitting block.

At S530, after determining the candidate light-emitting blocks from the plurality of light-emitting blocks, the sum values of the count offset values and the third count increments corresponding to the candidate light-emitting blocks can be determined, respectively. Whether to update the first light-emitting block can be determined based on the sum values and the third count increment of the first light-emitting block.

Figure 7:
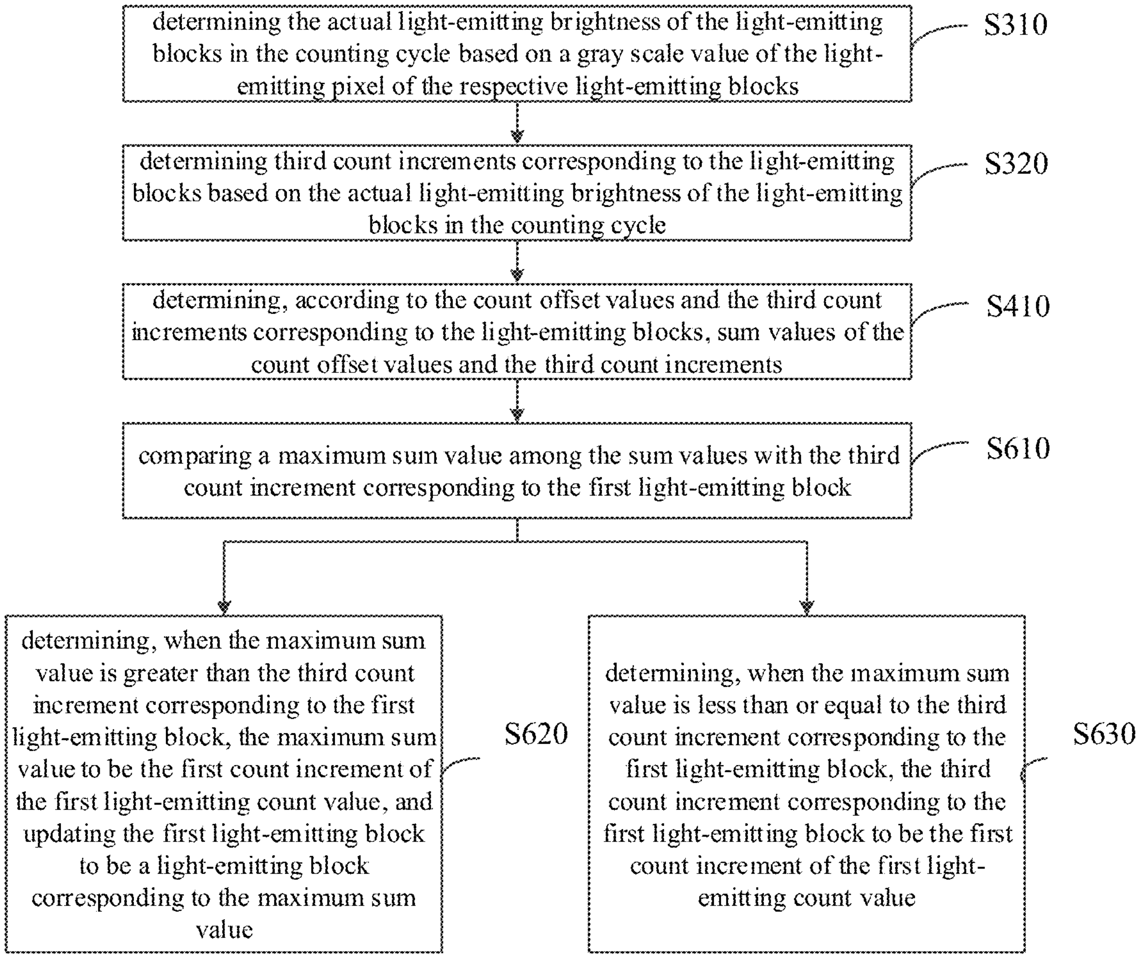
FIG. 7 is a detailed flow diagram of S210 of the method for performing brightness attenuation compensation of a display panel according to another embodiment of the present application.

As an embodiment, referring to FIG. 7, where the count offset values of the light-emitting blocks other than the first light-emitting block are less than or equal to zero; and the above S420 may include. S610, comparing a maximum sum value among the sum values with the third count increment corresponding to the first light-emitting block; S620, determining, when the maximum sum value is greater than the third count increment corresponding to the first light-emitting block, the maximum sum value to be the first count increment of the first light-emitting count value, and updating the first light-emitting block to be a light-emitting block corresponding to the maximum sum value; and S630, determining, when the maximum sum value is less than or equal to the third count increment corresponding to the first light-emitting block, the third count increment corresponding to the first light-emitting block to be the first count increment of the first light-emitting count value.

In this embodiment, when selecting a light-emitting block with the largest light-emitting count value among the plurality of light-emitting blocks as the first light-emitting block, the sum value of each light-emitting block can be compared with the third count increment corresponding to the first light-emitting block. If the maximum sum value is larger, the first light-emitting block is updated to the light-emitting block corresponding to the maximum sum value, and the maximum sum value is determined to be the first count increment. Conversely, if the third count increment of the first light-emitting block is larger, the first light-emitting block remains unchanged, and the third count increment corresponding to the first light-emitting block is determined to be the first count increment.

At S610, when selecting a light-emitting block with the largest light-emitting count value among the plurality of light-emitting blocks as the first light-emitting block, since the light-emitting count value corresponding to the first light-emitting block is the largest, in this case, the count offset values corresponding to the light-emitting blocks other than the first light-emitting block is less than or equal to zero. In the counting cycle, it is necessary to determine whether the first light-emitting block is still the light-emitting block with the largest light-emitting count value.

After obtaining the sum values of the determined count offset values and the third count increments corresponding to the light-emitting blocks, the display panel can compare a maximum sum value among the sum values with the third count increment corresponding to the first light-emitting block.

It should be understood that the light-emitting block corresponding to the maximum sum value among the multiple sum values will be the light-emitting block with the largest light-emitting count value in addition to the first light-emitting block after this counting cycle. Comparing the maximum sum value with the third count increment corresponding to the first light-emitting block can determine a magnitude relationship between the light-emitting count value of the light-emitting block and the light-emitting count value of the first light-emitting block.

At S620, when the maximum sum value is greater than the third count increment corresponding to the first light-emitting block, it indicates that the light emitting count value of the light-emitting block corresponding to the maximum sum value will be greater than the original light-emitting count value of the first light-emitting block after this counting cycle. At this time, the first light-emitting block can be updated to the light-emitting block corresponding to the maximum sum value, and the first count increment of the first light-emitting count value can be determined to be the maximum sum value.

In an exemplary implementation, taking the light-emitting block P1 and the light-emitting block P2 as an example, the light-emitting block P1 is the first light-emitting block, the count offset corresponding to the light-emitting block P2 is −10, the third count increment corresponding to the light-emitting block P1 is 2, and the third count increment of corresponding to the light-emitting block P2 is 15.

The sum value of the count offset and the third count increment of the light-emitting block P2 is −10+15=5. If the light-emitting block P2 is the light-emitting block with the largest neutralization value among multiple light-emitting blocks, the maximum sum value is 5 am this case. Comparing the maximum sum value with the third count increment corresponding to the first light-emitting block, the maximum sum value is greater than the third count increment corresponding to the first light-emitting block. Therefore, the first light-emitting block is updated to the light-emitting block P2, and the first count increment of the first light-emitting block is determined to be the sum value corresponding to the light-emitting block P2.

At S630, when the maximum sum value is less than or equal to the third count increment corresponding to the first light-emitting block, it indicates that the light emitting count value of the light-emitting block corresponding to the maximum sum value does not exceed the original light-emitting count value of the first light-emitting block after this counting cycle. At this time, the first light-emitting block remains unchanged, and the third count increment of the first light-emitting block is the first count increment of the first light emitting count value.

In an exemplary implementation, taking the light-emitting block P1 and the light-emitting block P2 as an example, the light-emitting block P1 is the first light-emitting block, the count offset value corresponding to the light-emitting block P2 is −10, the third count increment corresponding to the light-emitting block P1 is 10, and the third count increment corresponding to the light-emitting block P2 is 15.

The sum value of the count offset value and the third count increment of the light-emitting block P2 is −10+15=5. If the light-emitting block P2 is the light-emitting block with the largest neutralization value among multiple light-emitting blocks, the maximum sum value is 5 in this case. Comparing the maximum sum value with the third count increment corresponding to the first light-emitting block. At this time, the maximum sum value is smaller than the third count increment corresponding to the first light-emitting block. The first light-emitting block remains unchanged and remains the light-emitting block PT. The first count increment of the first light-emitting block is the third count increment corresponding to the light-emitting block P1.

It should be understood that in a single counting cycle, by comparing the maximum sum value with the third count increment of the first light-emitting block, it is possible to determine whether the first light-emitting block needs to be updated based on the comparison result, so that the first light-emitting block is always the light-emitting block with the largest light-emitting count value among the multiple light-emitting blocks.

Figure 8:
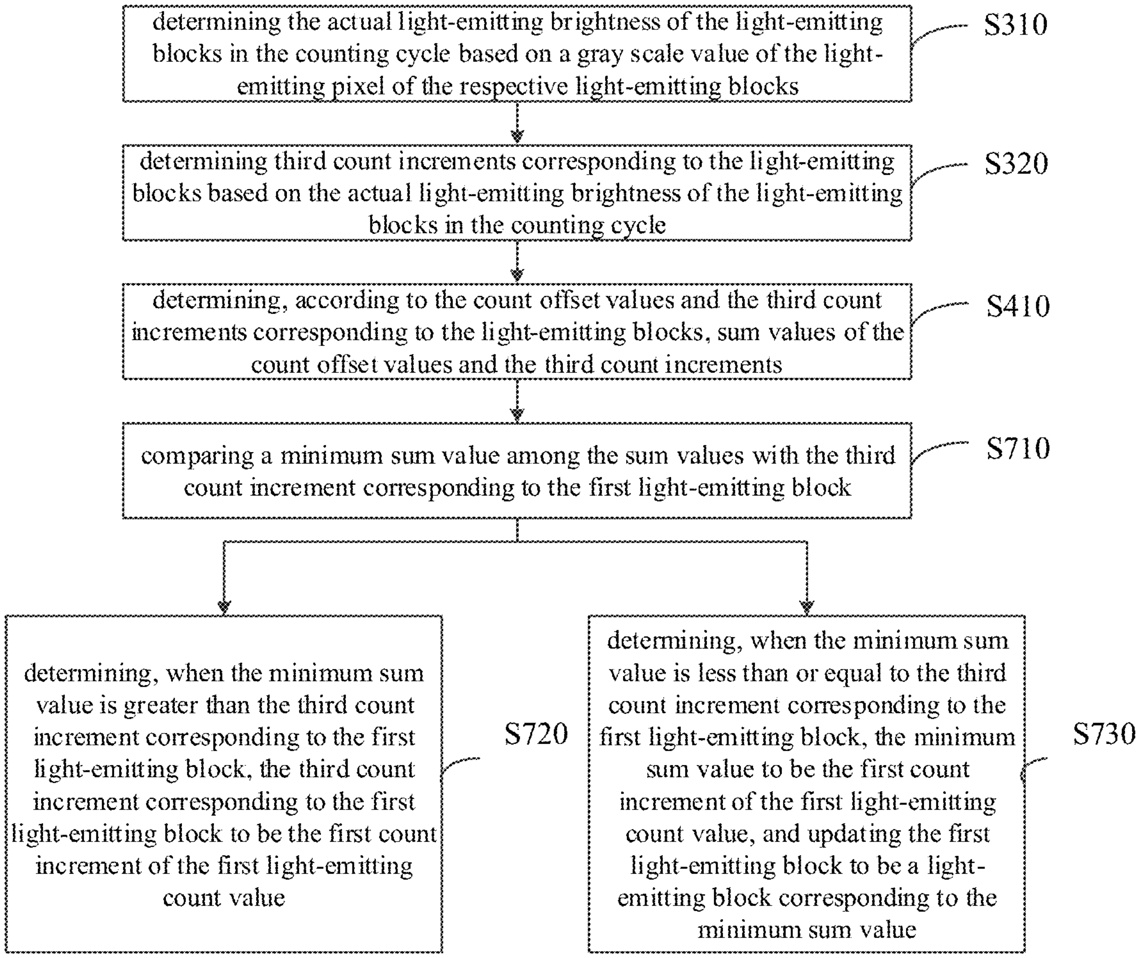
FIG. 8 is a detailed flow diagram of S210 of the method for performing brightness attenuation compensation of a display panel according to yet another embodiment of the present application.

As an embodiment, referring to FIG. 8, where the count offset values of the light-emitting blocks other than the first light-emitting block are greater than or equal to zero; and the above S420 may include: S710, comparing a minimum sum value among the sum values with the third count increment corresponding to the first light-emitting block; S720, determining, when the minimum sum value is greater than the third count increment corresponding to the first light-emitting block, the third count increment corresponding to the first light-emitting block to be the first count increment of the first light-emitting count value; and S730, determining, when the minimum sum value is less than or equal to the third count increment corresponding to the first light-emitting block, the minimum sum value to be the first count increment of the first light-emitting count value, and updating the first light-emitting block to be a light-emitting block corresponding to the minimum sum value.

In this embodiment, when selecting the light-emitting block with the smallest light emitting count value among the plurality of light-emitting blocks as the first light-emitting block, the sum value of each light-emitting block can be compared with the third count increment corresponding to the first light-emitting block. If the third count increment of the first light-emitting block is larger, the first light-emitting block is updated to a light-emitting block corresponding to the minimum sum value, and the minimum sum value is determined to be the first count increment. Conversely, if the minimum sum value is larger, the first light-emitting block remains unchanged, and the third count increment corresponding to the first light-emitting block is the first count increment.

At S710, similar to the previous embodiment in which the light-emitting block with the largest light emitting count value among the plurality of light-emitting blocks is selected as the first light-emitting block, in this embodiment, the light-emitting block with the smallest light emitting count value among the plurality of light-emitting blocks is selected as the first light-emitting block. Since the light-emitting count value corresponding to the first light-emitting block is the maximum, the count offset values corresponding to the light-emitting blocks other than the first light-emitting blocks is greater than or equal to zero. In the counting cycle, it is necessary to determine whether the first light-emitting block is still the light-emitting block with the lowest light-emitting count value.

The display panel can obtain the sum values of the determined count offset values and the third count increments corresponding to the light-emitting blocks and then compare a minimum sum value among the sum values with the third count increment corresponding to the first light-emitting block.

It should be understood that a light-emitting block corresponding to the minimum sum value among the sum values will be the light-emitting block with the smallest light-emitting count value after this counting cycle, except for the first light-emitting block. Comparing the minimum sum value with the third count increment corresponding to the first light-emitting block can determine a magnitude relationship of the light-emitting count value of the light-emitting block and the light-emitting count value of the first light-emitting block.

At S720, when the minimum sum value is greater than or equal to the third count increment corresponding to the first light-emitting block, it indicates that the the light-emitting count value of the light-emitting block corresponding to the minimum sum value is still greater than the original light-emitting count value of the first light-emitting block after this counting cycle. At this time, the light-emitting count value of the original first light-emitting block remains the minimum light-emitting count value, and the first light-emitting block remains unchanged, and the third count increment of the first light-emitting block is the first count increment of the first light emitting count value.

At S730, when the minimum sum value is smaller than the third count increment corresponding to the first light-emitting block, it indicates that the the light-emitting count value of the light-emitting block corresponding to the minimum sum value will be smaller than the original light-emitting count value of the first light-emitting block after this counting cycle. At this time, the first light-emitting block can be updated to the light-emitting block corresponding to the minimum sum value, and the first count increment of the first light emitting count value can be determined to be the minimum sum value.

As an embodiment, the light-emitting block may include light-emitting pixels of at least two different light-emitting colors.

Among the plurality of light-emitting blocks divided in the display area of the display panel, each light-emitting block may include light-emitting pixels of at least two different light-emitting colors. For light-emitting pixels with different light-emitting colors in a same light-emitting block, a same compensation target can be used for brightness attenuation compensation.

As an embodiment, the light-emitting block may include at least one light-emitting unit, the light emitting unit including a first light-emitting pixel, a second light-emitting pixel and a third light-emitting pixel which have different light-emitting colors.

Each light-emitting block in the display panel may include at least one light emitting unit, which may include a first light-emitting pixel, a second light-emitting pixel, and a third light-emitting pixel with different light-emitting colors. For example, the light-emitting unit may include a red light-emitting pixel, a blue light-emitting pixel, and a green light-emitting pixel.

In addition, the light-emitting unit may also include a fourth light-emitting pixel, which may be a white light-emitting pixel, a yellow light-emitting pixel, or the like, without limitation herein.

At S220, after determining the first count increment of the first light-emitting count value based on the actual light-emitting brightness the light-emitting blocks in the counting cycle, the first light-emitting count value can be updated based on the first count increment. The updated first light-emitting count value is the sum of the original first light-emitting count value and the first count increment.

At S230, after updating the first light-emitting count value, the count offset values of the light-emitting blocks can also be updated respectively. In an implementation, new light-emitting count values of the light-emitting blocks after the current counting cycle can be determined, and the count offset values of the light-emitting blocks can be determined by calculating differences of the updated first light-emitting count value and the new light-emitting count value of the light-emitting blocks.

In the above implementation, it is necessary to calculate the light-emitting count values of the light-emitting blocks respectively. As the light-emitting count values continue to accumulate with an increase of working duration of the display panel, the light-emitting count values are relatively large. In order to reduce computational resources for the count offset values, second count increments corresponding to the light-emitting block can also be determined based on the first count increment and the actual light-emitting brightness of the light-emitting blocks.

As an embodiment, the above S230 may include: determining second count increments corresponding to the light-emitting blocks based on the first count increment and the third count increments of the light-emitting blocks.

In this embodiment, in a single counting cycle, the actual light-emitting bright of the light-emitting blocks can be determined based on the gray scale value of the light-emitting pixel in the light-emitting blocks, and the third count increments of the light-emitting blocks can be determined based on a corresponding between actual light-emitting bright and third count increments.

The corresponding between actual light-emitting bright and third count increments may be defined by dividing the actual light-emitting brightness into multiple brightness ranges as exemplified in the above embodiment, and matching each brightness range to a value in the third count increments. In addition, there may be a pre-generated fitting polynomial of the actual light-emitting brightness and the third count increment, and then actual-light-emitting brightness can be substituted into the fitting polynomial to obtain a corresponding third count increment.

It should be understood that when determining the first count increment of the first light-emitting count value, it is necessary to determine the third count increments corresponding to the light-emitting blocks. The plurality of third count increments can be stored in the storage module of the display panel. When it is necessary to calculate the second count increments corresponding to the light-emitting block, the third count increments corresponding to the light-emitting blocks calculated in advance can be directly retrieved.

According to the first count increment and the third count increments corresponding to the light-emitting block, the second count increments corresponding to the light-emitting blocks can be obtained by calculating differences between the third count increments and the first count increment, respectively.

For example, when the first count increment of the first light-emitting count value is 10 and the third count increment of a light-emitting block is 5, the difference between the third count increment and the first count increment is −5, then the second count increment corresponding to the light-emitting block is −5.

At S240, the count offset values of the light-emitting blocks can be updated based on the second count increments of the light-emitting block. The updated count offset values can be the sum values of the original count offset values and the second count increments. For example, if the original count offset is −10 and the second count increment is −5, the updated count offset is −15.

At S120, after determining the first light-emitting count value and the count offset values corresponding to the light-emitting blocks, the first light-emitting count value and the count offset values corresponding the light-emitting blocks can be substituted into the first correspondence to determine brightness differences between the first light-emitting block and the light-emitting blocks, respectively.

The first correspondence may be correspondence between the light-emitting count values and light-emitting brightness obtained according to an aging test of the display panel. It should be understood that during the aging test of the display panel, the light-emitting brightness will gradually reduce as the time for light-emitting increases, i.e., there is a negative correlation between the time for light-emitting and the light-emitting brightness. Due to the positive correlation between the light-emitting count value and the time for light-emitting of the light-emitting block, a corresponding relationship between the light-emitting count value and the light-emitting brightness, that is, the first corresponding, can be generated based on data of the aging test.

A brightness attenuation degree of the first light-emitting block can be determined based on the first light-emitting count value and the first correspondence. According to the count offset values corresponding to the light-emitting blocks, a brightness attenuation degree of each light-emitting block relative to the first light-emitting block can be determined by substituting its count offset value into the first correspondence. The light-emitting brightness difference between each of the light-emitting blocks and the first light-emitting block can be determined based on the brightness attenuation degree of the first light-emitting block and each of the light-emitting blocks.

At S130, after determining the light-emitting brightness difference between each of the light-emitting blocks and the first light-emitting block, brightness attenuation compensation can be performed for each of the light-emitting blocks based on the light-emitting brightness difference of each of the light-emitting blocks, so that the brightness attenuation degree of each of the light-emitting blocks after compensation is close to the brightness attenuation degree of the first light-emitting block.

It should be noted that brightness attenuation will occur in various parts of the display area of the display panel during the display process. Due to differences in brightness of the displayed images and different location of various parts of the display area, brightness attenuation degree of different parts of the display areas may not be the same. By dividing the display area into multiple light-emitting blocks and determining one of the light-emitting blocks as the first light-emitting block, brightness attenuation compensation can be performed for each of the light-emitting blocks using the first light-emitting block as a reference and based on a brightness difference between each of the light-emitting blocks and the first light-emitting block. After brightness attenuation compensation, the brightness difference between each of the light-emitting blocks and the first light-emitting block decreases, which can maintain display uniformity of the display panel and avoid uneven display in different areas. Moreover, since each of the light-emitting block is compensated in brightness attenuation based on the first light-emitting block that also undergoes aging attenuation, compared with brightness attenuation compensation based on an initial brightness at the factory, a compensation amplitude of the driving current for driving the light-emitting pixel to emit light is smaller, which can reduce brightness attenuation effects caused by increase of the driving current, while ensuring uniformity of the display effects, and also avoid the problem of shortening the service life caused by brightness compensation, and thus improve the overall life of the display panel.

Figure 9:
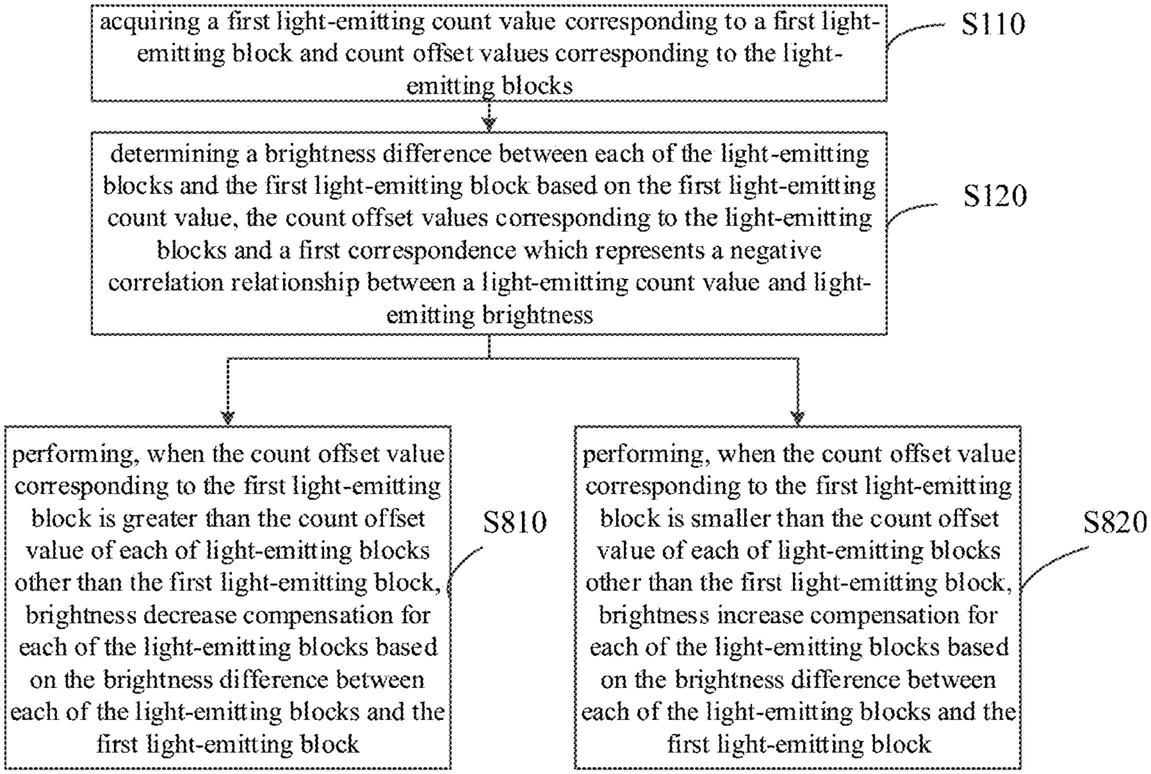
FIG. 9 is a flowchart illustrating a method for performing brightness attenuation compensation of a display panel according to another embodiment of the present application.

As an embodiment, referring to FIG. 9, the above S130 may include: S810, performing, when the count offset value corresponding to the first light-emitting block is greater than the count offset value of each of light-emitting blocks other than the first light-emitting block, brightness decrease compensation for each of the light-emitting blocks based on the brightness difference between each of the light-emitting blocks and the first light-emitting block; and S820, performing, when the count offset value corresponding to the first light-emitting block is smaller than the count offset value of each of light-emitting blocks other than the first light-emitting block, brightness increase compensation for each of the light-emitting blocks based on the brightness difference between each of the light-emitting blocks and the first light-emitting block.

In this embodiment, when performing brightness compensation for each of the light-emitting blocks based on the first light-emitting block, if the light-emitting count value of the first light-emitting block is the maximum light-emitting count value among the multiple light-emitting blocks, the first light-emitting block is the light-emitting block with the highest brightness attenuation degree, and brightness decrease compensation is required for the other light-emitting blocks. On the contrary, if the light-emitting count value of the first light-emitting block is the smallest light-emitting count value among the plurality of light-emitting blocks, the first light-emitting block is the light-emitting block with the lowest brightness attenuation degree, and brightness increase compensation is required for the other light-emitting blocks.

Figure 10:
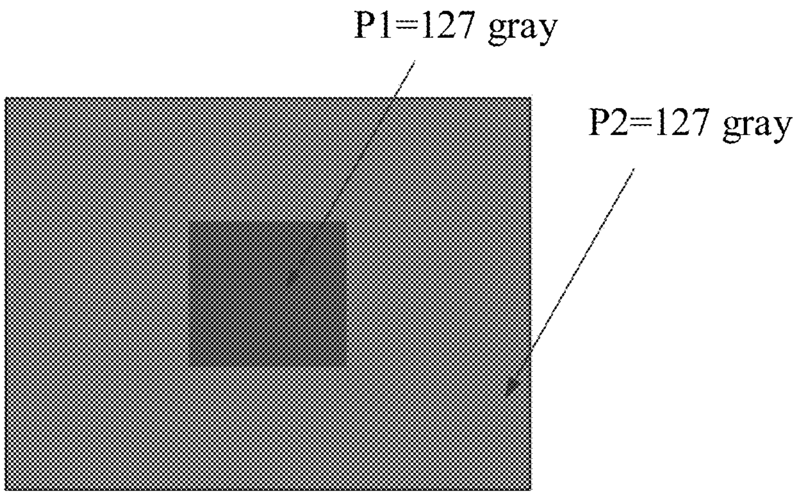
FIG. 10 is a schematic diagram of display effects when attenuation of the first light-emitting block is maximum according to an embodiment of the present application.

At S810, when performing brightness compensation for each light-emitting block, qualitative brightness compensation can be performed based on the brightness attenuation degree of the first light-emitting block and the light-emitting block. When the count offset value corresponding to the first light-emitting block is greater than the count offset value of the remaining light-emitting blocks, it can be determined that the light-emitting count value of the first light-emitting block is the maximum light-emitting count value among the light-emitting blocks, and in this case, the first light-emitting block is the light-emitting block with the greatest brightness attenuation degree among the light-emitting blocks. As shown in FIG. 10, the light-emitting block P1 is the first light-emitting block. At a gray scale value of 127, the brightness attenuation degree of the light-emitting block P1 is greater than the brightness attenuation degree of the light-emitting block P2. Therefore, when performing brightness compensation for the other light-emitting blocks, it is necessary to perform brightness decrease compensation for each of the light-emitting blocks based on the brightness difference between each of the light-emitting blocks and the first light-emitting block, so that the brightness of each of the light-emitting blocks after compensation is relatively close to the brightness of the first light-emitting block.

Since the first light-emitting count value is the light-emitting count value corresponding to the first light-emitting block, the count offset value corresponding to the first light-emitting blocks is 0. When the count offset value corresponding to the first light-emitting block is greater than the count offset value of the remaining light-emitting blocks, it indicates that the count offset values of the remaining light-emitting blocks are all negative or 0. Therefore, the first light-emitting count value is the maximum light-emitting count value among the light-emitting blocks.

Figure 11:
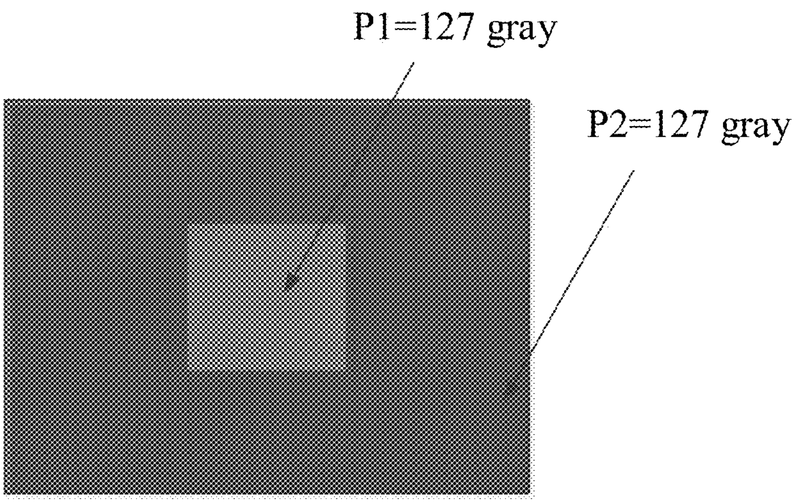
FIG. 11 is a schematic diagram of a display effect when attenuation of the first light-emitting block is minimum according to an embodiment of the present application.

At S820, similarly, when the count offset value corresponding to the first light-emitting block is smaller than the count offset values of the remaining light-emitting blocks, it can be determined that the light-emitting count value of the first light-emitting block is the smallest light-emitting count value among the light-emitting blocks, and in this case, the first light-emitting block is the light-emitting block with the smallest brightness attenuation degree among the light-emitting blocks. As shown in FIG. 11, the light-emitting block P1 is the first light-emitting block. At a gray scale value of 127, the brightness attenuation degree of the light-emitting block P1 is smaller than the brightness attenuation degree of the light-emitting block P2. Therefore, when performing brightness compensation for each of the other light-emitting blocks, it is necessary to perform brightness increase compensation for each of the other light-emitting blocks based on the brightness difference between each of the light-emitting blocks and the first light-emitting block, so that the brightness of each of the light-emitting block after compensation is relatively close to the brightness of the first light-emitting block.

As an embodiment, the display area of the display panel may include a plurality of light-emitting regions, and each light-emitting region includes a plurality of light-emitting blocks; and prior to S110, the method may further include: S110 is executed for each of the light emitting regions.

In this embodiment, the display area of the display panel may include a plurality of light-emitting regions, and each light-emitting region may be divided into a plurality of light-emitting blocks. That is, for each light-emitting region, a first light-emitting block can be determined from a plurality of light-emitting blocks, and brightness attenuation compensation can be performed for each of the light-emitting blocks based on the brightness difference between each of the light-emitting blocks and the first light-emitting block.

As an embodiment, the display panel may at least include a first display area and a second display area with different light transmittance. The first correspondence of the first display area and the first correspondence of the second display area may be inconsistent, and the light-emitting area is located within the first display area or within the second display area.

In this embodiment, the display area of the display panel can may at least include a first display area and a second display area, wherein the light transmittance of the first display area and the second display area can be different. For example, the first display area may be a normal display area, and the second display area may be an underscreen display area. Since a shooting component should be installed below the underscreen display area, the second display area must meet requirements for a larger light transmittance in order to enable the shooting component to achieve a shooting function. Therefore, there will be a difference in the light transmittance between the first display area and the second display area.

In order to achieve different light transmittance in different display areas, a commonly used setting method includes: adjusting pixel density of light-emitting pixels in different display areas; extending wirings between a pixel circuit and light-emitting elements in the light-emitting pixel so that the pixel circuit and the light-emitting elements are respectively arranged in a display area with a low light transmittance and a display area with a high light transmittance; adjusting light-emitting areas of the light-emitting elements in different display areas; and for display areas with larger light transmittance, applying a one-to-multiple design in which a single pixel circuit is provided to drive multiple light-emitting elements.

It should be understood that the above setting method for achieving difference in light transmittance of different display areas will result in difference in aging and attenuation levels of two display areas. That is, brightness attenuation that occurs in the two display areas during the same time for light-emitting is not the same. Therefore, during production and testing of display panel, an aging test can also be performed on each of the display areas to obtain the first corresponding for each of the display areas.

When dividing the display area of a display panel into multiple light-emitting regions, in order to avoid a single light-emitting region spanning two display regions, resulting in a significant difference in brightness between light-emitting blocks located in different display regions in the single light-emitting region, it is possible to set the division method so that a single light-emitting region can only be located in the first display region alone or in the second display region alone when dividing the light-emitting region, to avoid significant brightness differences between different light-emitting blocks within a single light-emitting region.

Figure 12:
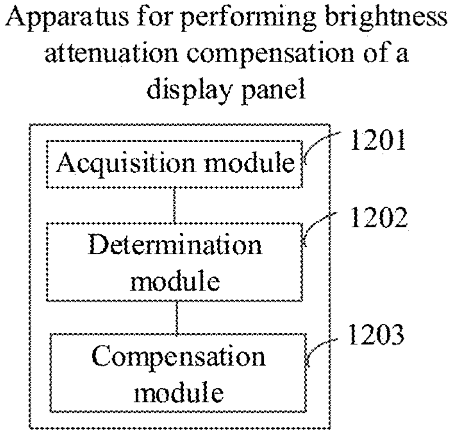
FIG. 12 is a structural diagram of an apparatus for performing brightness attenuation compensation of a display panel according to an embodiment of the present application.

The embodiments of the present application also provides an apparatus for performing brightness attenuation compensation of a display panel, as shown in FIG. 12. The apparatus includes: an acquisition module 1201 configured to acquire a first light-emitting count value corresponding to a first light-emitting block and count offset values corresponding to the light-emitting blocks; a determination module 1202 configured to determine a brightness difference between each of the light-emitting blocks and the first light-emitting block based on the first light-emitting count value, the count offset values corresponding to the light-emitting blocks and a first correspondence which represents a negative correlation relationship between a light-emitting count value and light-emitting brightness; and a compensation module 1203 configured to perform brightness attenuation compensation of each of the light-emitting blocks based on the brightness difference between each of the light-emitting block and the first light-emitting block.

Figure 13:
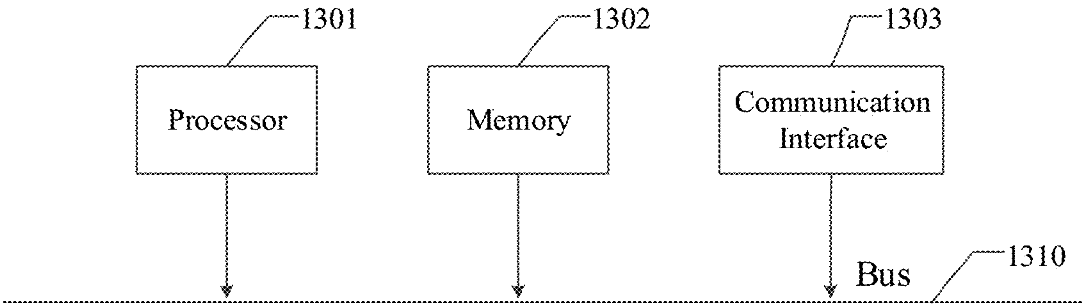
FIG. 13 shows a structural diagram of a device for performing brightness attenuation compensation of a display panel according to an embodiment of the present application.

FIG. 13 shows a hardware structural diagram of a device for performing brightness attenuation compensation of a display panel according to an embodiment of the present application.

The device for performing brightness attenuation compensation of a display panel includes a processor 1301 and a memory 1302 for storing computer program instructions.

Specifically, the processor 1301 may include a central processing unit (CPU), or an application specific integrated circuit (ASIC), or may be one or more integrated circuits configured to implement the embodiments of the present application.

The memory 1302 may include mass storage for data or instructions. For example, rather than limiting, the memory 1302 may include a hard disk drive (HDD), a floppy disk drive, flash memory, optical disk, magneto-optical disk, magnetic tape, or Universal Serial Bus (USB) drive, or a combination of two or more of these. Where appropriate, the memory 1302 may include a removable or non-removable (or fixed) medium. Where appropriate, the memory 1302 may be inside or outside of the device for performing brightness attenuation compensation of a display panel. In certain embodiments, the memory 1302 may be a nonvolatile solid-state memory.

In certain embodiments, the memory 1302 may include a read-only memory (ROM), random access memory (RAM), disk storage medium device, optical storage medium device, flash memory device, electrical, optical, or other physical/tangible memory storage device. Therefore, in general, the memory includes one or more tangible (non-transient) computer-readable storage media (e.g., memory devices) encoded with software that includes computer-executable instructions, and the software is executed (e.g., by one or more processors) to perform operations described with reference to a method according to an aspect of the present application.

The processor 1301 reads and executes computer program instructions stored in the memory 1302 to implement the method for performing brightness attenuation compensation of a display panel in the above embodiments.

In one example, the device for performing brightness attenuation compensation of a display panel may also include a communication interface 1303 and a bus 1310. As shown in FIG. 13, the processor 1301, the memory 1302, and the communication interface 1303 are connected and communicate with each other through the bus 1310.

The communication interface 1303 is mainly used to achieve communication between various modules, components, units, and/or devices of the embodiments of the present application.

The bus 1310 includes hardware, software, or the both that couple the components of the device for performing brightness attenuation compensation of a display panel to each other. For example, rather than limitation, the bus may include an Accelerated Graphics Port (AGP) or other graphics bus, Enhanced Industry Standard Architecture (EISA) bus, Front End Bus (FSB), Hyper Transfer (HT) interconnect, Industry Standard Architecture (ISA) bus, Infinite Bandwidth interconnect, Low Pin Count (LPC) bus, Memory bus, Microchannel Architecture (MCA) bus, Peripheral Component Interconnect (PCI) bus, PCI-Express (PCI-X) bus Serial Advanced Technology Attachment (SATA) bus, Video Electronics Standards Association Local (VLB) bus, or other suitable bus, or a combination of two or more of these. Where appropriate, the bus 1310 may include one or more buses. Although the embodiments of the present application describe and illustrate specific buses, any suitable buses or interconnections can be considered in the present application.

In addition, in combination with the method for performing brightness attenuation compensation of a display panel in the above embodiments, the embodiments of the present application can provide a computer storage medium. The computer storage medium stores computer program instructions thereon, which are executed by a processor to implement the method for performing brightness attenuation compensation of a display panel in the above embodiments.

It should be noted that the present application is not limited to the specific configuration and processes described above and shown in the figures. For simplicity, a detailed description of known methods has been omitted here. In the above embodiments, several specific steps are described and shown as examples. However, the method of the present application is not limited to the specific steps described and shown. Those skilled in the art can make various changes, modifications, additions, or change the order between steps after understanding the gist of the present application.

The functional blocks shown in the above structural block diagram can be implemented as hardware, software, firmware, or a combination thereof. When implemented in hardware, it can be, for example, electronic circuits, application specific integrated circuits (ASICs), appropriate firmware, plug-ins, function cards, and the like. When implemented in software, the elements of the present application are programs or code segments that are used to perform the required tasks. The programs or code segments can be stored in a machine-readable medium, or transmitted through a transmission medium or communication link through data signals carried in a carrier wave. "Machine readable medium" may include any medium capable of storing or transmitting information. Examples of machine readable medium include electronic circuits, semiconductor memory devices, ROM, flash memories, erasable ROMs (EROMs), floppy disks, CD-ROMs, optical disks, hard disks, optical fiber media, radio frequency (RF) links, and so on. Code segments can be downloaded via a computer network such as the Internet, intranet, and the like.

It should also be noted that the exemplary embodiments mentioned in the present application describe some methods or systems based on a series of steps or devices. However, the present application is not limited to the sequence of the steps described above, that is, the steps can be executed in the order described in the embodiments, or in a different order than that described in the embodiments, or several steps can be executed simultaneously.

Various aspects of the present disclosure are described above with reference to flowcharts and/or block diagrams of methods, devices (systems), and computer program products according to the embodiments of the present application. It should be understood that each block in a flowchart and/or block diagram and combinations of the blocks in the flowchart and/or block diagram can be implemented by computer program instructions. These computer program instructions may be provided to a processor of a general-purpose computer, dedicated computer, or other programmable data processing device to generate a machine that enables implementation of the functions/actions specified in one or more blocks of the flowchart and/or block diagram by executing these instructions via a processor of a computer or other programmable data processing device. The processor may be, but is not limited to, a general-purpose processor, a special-purpose processor, a special application processor, or a field programmable logic circuit. It also should be understood that each block in a block diagram and/or flowchart and combinations of blocks in the block diagram and/or flowchart can also be implemented by dedicated hardware that performs specified functions or actions, or by a combination of dedicated hardware and computer instructions.

The above provides only specific embodiments of the present application, and those skilled in the art can clearly understand that for the convenience and conciseness of the description, the specific working processes of the system, module, and unit described above can refer to the corresponding processes in the aforementioned method embodiments, and will not be repeated here. It should be understood that the protection scope of the present application is not limited thereto. Those skilled in the art can easily think of various equivalent modifications or replacements within the technical scope disclosed in the present application, and these modifications or replacements should be covered by the protection scope of the present application.

What is claimed is:

1. A method for performing brightness attenuation compensation of a display panel, a display area of which comprises a plurality of light-emitting blocks and each of the light-emitting block comprises at least one light-emitting pixel, the method comprising:

acquiring a first light-emitting count value corresponding to a first light-emitting block and count offset values corresponding to the light-emitting blocks;

determining a brightness difference between each of the light-emitting blocks and the first light-emitting block based on the first light-emitting count value, the count offset values corresponding to the light-emitting blocks and a first correspondence which represents a negative correlation relationship between a light-emitting count value and light-emitting brightness; and performing brightness attenuation compensation of each of the light-emitting blocks based on the brightness difference between each of the light-emitting blocks and the first light-emitting block, wherein before acquisition of the first light-emitting count value and the count offset values corresponding to the light-emitting blocks, the method further comprises:

determining, for each of counting cycles when the display panel displays images, a first count increment of the first light-emitting count value based on actual light-emitting brightness of the light-emitting blocks by:

determining the actual light-emitting brightness of the light-emitting blocks in the counting cycle based on a gray scale value of the light-emitting pixel of the respective light-emitting blocks;

determining third count increments corresponding to the light-emitting blocks based on the actual light-emitting brightness of the light-emitting blocks in the counting cycle; and determining the first count increment of the first light-emitting count value based on the count offset values and the third count increments corresponding to the light-emitting blocks;

updating the first light-emitting count value according to the first count increment; and determining second count increments corresponding to the light-emitting blocks based on the first count increment and the actual light-emitting brightness of the light-emitting blocks; and updating the count offset values corresponding to the light-emitting blocks based on the second count increments.

2. The method for performing brightness attenuation compensation of a display panel according to claim 1, wherein the determination of the second count increments corresponding to the light-emitting blocks based on the first count increment and the actual light-emitting brightness of the light-emitting blocks comprises:

computing the second count increments corresponding to the light-emitting blocks based on the first count increment and the third count increments corresponding to the light-emitting blocks.

3. The method for performing brightness attenuation compensation of a display panel according to claim 1, wherein the count offset value corresponding to the first light-emitting block is zero, and the determination of the first count increment of the first light-emitting count value based on the count offset values and the third count increments corresponding to the light-emitting blocks comprises:

determining, according to the count offset values and the third count increments corresponding to the light-emitting blocks, sum values of the count offset values and the third count increments; and determining the first count increment of the first light-emitting count value based on the sum values and the third count increment corresponding to the first light-emitting block.

4. The method for performing brightness attenuation compensation of a display panel according to claim 3, wherein the determination, according to the count offset values and the third count increments corresponding to the light-emitting blocks, of the sum values of the count offset values and the third count increments comprises:

determining a theoretical maximum value of the third count increments based on a numerical range of the third count increments;

selecting, according to the count offset values corresponding to the light-emitting blocks, light-emitting blocks whose count offset value has an absolute value less than the theoretical maximum value from the light-emitting blocks as candidate light-emitting blocks; and calculating, for the candidate light-emitting blocks, the sum values of the count offset values and the third count increments corresponding to the candidate light-emitting blocks.

5. The method for performing brightness attenuation compensation of a display panel according to claim 3, wherein the count offset value of each of light-emitting blocks other than the first light-emitting block is less than or equal to zero, and the determination of the first count increment of the first light-emitting count value based on the sum values and the third count increment corresponding to the first light-emitting block comprises:

comparing a maximum sum value among the sum values with the third count increment corresponding to the first light-emitting block;

determining, when the maximum sum value is greater than the third count increment corresponding to the first light-emitting block, the maximum sum value to be the first count increment of the first light-emitting count value, and updating the first light-emitting block to be a light-emitting block corresponding to the maximum sum value; and determining, when the maximum sum value is less than or equal to the third count increment corresponding to the first light-emitting block, the third count increment corresponding to the first light-emitting block to be the first count increment of the first light-emitting count value.

6. The method for performing brightness attenuation compensation of a display panel according to claim 3, wherein the count offset value of each of light-emitting blocks other than the first light-emitting block is greater than or equal to zero, and determination of the first count increment of the first light-emitting count value based on the sum values and the third count increment corresponding to the first light-emitting block comprises:

comparing a minimum sum value among the sum values with the third count increment corresponding to the first light-emitting block;

determining, when the minimum sum value is greater than the third count increment corresponding to the first light-emitting block, the third count increment corresponding to the first light-emitting block to be the first count increment of the first light-emitting count value; and determining, when the minimum sum value is less than or equal to the third count increment corresponding to the first light-emitting block, the minimum sum value to be the first count increment of the first light-emitting count value, and updating the first light-emitting block to be a light-emitting block corresponding to the minimum sum value.

7. The method for performing brightness attenuation compensation of a display panel according to claim 1, wherein the light-emitting block comprises light-emitting pixels of at least two different light-emitting colors.

8. The method for performing brightness attenuation compensation of a display panel according to claim 7, wherein the light-emitting block comprises at least one light-emitting unit, the light emitting unit comprising a first light-emitting pixel, a second light-emitting pixel and a third light-emitting pixel which have different light-emitting colors.

9. The method for performing brightness attenuation compensation of a display panel according to claim 1, wherein the first light-emitting count value and the count offset values are stored in a storage module of the display panel, and a storage space occupied by the first light-emitting count value is greater than a storage space occupied by the count offset value.

10. The method for performing brightness attenuation compensation of a display panel according to claim 9, wherein the acquisition of the first light-emitting count value and the count offset values corresponding to the light-emitting blocks comprises:

retrieving the first light emitting count value and the count offset values corresponding to the light-emitting blocks from the storage module when the display panel is powered on.

11. The method for performing brightness attenuation compensation of a display panel according to claim 1, wherein the performance of the brightness attenuation compensation of each of the light-emitting blocks based on the brightness difference between each of the light-emitting blocks and the first light-emitting block comprises:

performing, when the count offset value corresponding to the first light-emitting block is greater than the count offset value of each of light-emitting blocks other than the first light-emitting block, brightness decrease compensation for each of the light-emitting blocks based on the brightness difference between each of the light-emitting blocks and the first light-emitting block; and performing, when the count offset value corresponding to the first light-emitting block is smaller than the count offset value of each of light-emitting blocks other than the first light-emitting block, brightness increase compensation for each of the light-emitting blocks based on the brightness difference between each of the light-emitting blocks and the first light-emitting block.

12. The method for performing brightness attenuation compensation of a display panel according to claim 1, wherein the display area of the display panel comprises a plurality of light-emitting regions, and each of the light-emitting regions comprises a plurality of light-emitting blocks, and wherein before acquisition of the first light-emitting count value and the count offset values corresponding to the light-emitting blocks, the method further comprises:

performing the step of acquiring the first light-emitting count value and the count offset values corresponding to the light-emitting blocks for each of the light-emitting regions.

13. The method for performing brightness attenuation compensation of a display panel according to claim 12, wherein the display panel comprises at least a first display area and a second display area with different light transmittance, the first correspondence of the first display area is not consistent with the first correspondence of the second display area, and the light-emitting regions are located within the first display area or within the second display area.

14. An apparatus for performing brightness attenuation compensation of a display panel, a display area of which comprises a plurality of light-emitting blocks, the apparatus comprising:

an acquisition module configured to acquire a first light-emitting count value corresponding to a first light-emitting block and count offset values corresponding to the light-emitting blocks;

a determination module configured to determine a brightness difference between each of the light-emitting blocks and the first light-emitting block based on the first light-emitting count value, the count offset values corresponding to the light-emitting blocks and a first correspondence which represents a negative correlation relationship between a light-emitting count value and light-emitting brightness; and a compensation module configured to perform brightness attenuation compensation of each of the light-emitting blocks based on the brightness difference between each of the light-emitting blocks and the first light-emitting block, wherein the acquisition module is further configured to:

determine, for each of counting cycles when the display panel displays images, a first count increment of the first light-emitting count value based on actual light-emitting brightness of the light-emitting blocks by:

determine the actual light-emitting brightness of the light-emitting blocks in the counting cycle based on a gray scale value of the light-emitting pixel of the respective light-emitting blocks;

determine third count increments corresponding to the light-emitting blocks based on the actual light-emitting brightness of the light-emitting blocks in the counting cycle; and determine the first count increment of the first light-emitting count value based on the count offset values and the third count increments corresponding to the light-emitting blocks;

update the first light-emitting count value according to the first count increment; and determine second count increments corresponding to the light-emitting blocks based on the first count increment and the actual light-emitting brightness of the light-emitting blocks; and update the count offset values corresponding to the light-emitting blocks based on the second count increments.

15. A device for performing brightness attenuation compensation of a display panel, comprising:

a processor; and a memory for storing computer program instructions;

wherein the processor is configured to execute the computer program instructions to implement a method for performing brightness attenuation compensation of a display panel according to claim 1.

* * * * *